United States Patent [19]

Matsuda et al.

[11] Patent Number: 4,532,620

[45] Date of Patent: Jul. 30, 1985

[54] COIL ASSEMBLY HAVING STACKED SPIRAL PATTERN LAYERS AND METHOD OF MAKING

[75] Inventors: Norio Matsuda; Toshio Konno; Kaneo Yamamoto; Shinya Tominaga; Susumu Kubo; Yasuyuki Mori; Naoki Akiyama; Masaki Murakami, all of Yokohama, Japan

[73] Assignee: Victor Company of Japan, Ltd., Japan

[21] Appl. No.: 400,232

[22] Filed: Jul. 21, 1982

Related U.S. Application Data

[63] Continuation of Ser. No. 72,696, Sep. 5, 1979, abandoned.

[30] Foreign Application Priority Data

Sep. 11, 1978 [JP] Japan ................................ 53-124585

[51] Int. Cl.$^3$ ........................... H04R 9/16; G11B 5/42

[52] U.S. Cl. ..................................... 369/136; 369/147; 361/402; 361/414

[58] Field of Search ................ 336/200, 232; 361/414, 361/402; 369/136, 139, 147

[56] References Cited

U.S. PATENT DOCUMENTS

| | | | |
|---|---|---|---|
| 3,413,716 | 12/1968 | Schwertz et al. | 29/602 |
| 3,484,731 | 12/1969 | Rich | 336/200 |
| 3,546,775 | 12/1970 | Lalmon et al. | 29/625 |
| 3,549,825 | 12/1970 | Trimble | 179/100.2 |
| 3,685,144 | 8/1972 | Trimble | 360/123 |
| 3,769,698 | 11/1973 | Lademann et al. | 29/602 |
| 3,798,059 | 3/1974 | Astle et al. | 117/212 |
| 3,833,872 | 9/1974 | Marcus et al. | 336/83 |
| 3,848,210 | 11/1974 | Felkner | 336/200 |
| 4,012,703 | 3/1977 | Chamberlayne | 333/24 R |
| 4,223,360 | 9/1980 | Sansom et al. | 360/123 |
| 4,251,695 | 2/1981 | Ono et al. | 369/147 |
| 4,253,079 | 2/1981 | Brosh | 336/84 |
| 4,374,433 | 2/1983 | Ogawa et al. | 369/147 |

FOREIGN PATENT DOCUMENTS

| | | | |
|---|---|---|---|
| 631350 | 12/1961 | Italy | 336/270 |

OTHER PUBLICATIONS

Hicks, "Thin-Film Electroplated Funnel Thru-Holes on Polyimide Resin and Laminated Boards", Solid State Technology, 7/73, pp. 36-40.

*Primary Examiner*—Robert L. Richardson
*Attorney, Agent, or Firm*—Lowe, King, Price & Becker

[57] ABSTRACT

A coil assembly comprises a plurality of conductive spiral pattern layers which are piled up via (an) insulating layer(s) on a wafer. The electrical connection between the spiral patterns is established by means of a conductive member, which is a portion of the upper spiral pattern layer, filled in a through-hole which is made in the insulating layer so that the spiral patterns are connected in series to develop a high voltage when the coil assembly is moved in a magnetic field.

8 Claims, 19 Drawing Figures

COIL ASSEMBLY HAVING STACKED SPIRAL PATTERN LAYERS AND METHOD OF MAKING

This is a continuation of application Ser. No. 072,696 filed Sept. 5, 1979, now abandoned.

FIELD OF THE INVENTION

This invention generally relates to a coil for picking up vibrations. More particularly, the present invention is related to a coil used in dynamic (moving-coil type) phonograph pickups.

BACKGROUND OF THE INVENTION

Conventional coils used in moving-coil type phonograph pickups (cartridges) for picking up audio signals from phonograph records (discs) comprises at least one coil which has a winding made of a conductive wire. It is generally known that a coil which is light in weight is advantageous since lighter coils have less influence on the vibrations of the vibratory member, such as a stylus arm, to which the coil is secured. In order to provide a light coil a fabricating method of an IC (integrated circuit) was recently adopted and a coil which is made of a microstrip of spiral pattern was developed. This newly developed coil comprises a conductive spiral pattern layer formed on a suitable substrate and is produced by well known photolithographic processes.

Although the above described newly developed coil is superior and is advantageous in that the weight of the coil proper is remarkably reduced compared to the conventional winding type coils, the output voltage of the spiral pattern type coil is in the same level as that of the conventional winding type coils. As is well known, the output voltage of a moving-coil type phonograph pick up is much lower than that of the moving magnet type pickups. Therefore, when a moving-coil type phonograph pickup is employed, a step up transformer is required to raise the output voltage to a sufficient level prior to feeding the output to the input of a preamplifier.

Provision of a step up transformer causes the input signal of the preamplifier to be deteriorated in the signal to noise ratio. Therefore, it would be advantageous, in view of high fidelity sound reproduction, if such a step by transformer were omitted. In order to directly apply the output voltage of the coil of a dynamic phonograph pickup to a preamplifier by omitting a step up transformer, the output voltage of the coil has to be high enough so as to meet the requirement of the preamplifier.

Since the output voltage of a coil is in proportion to the number of turns of the winding or conductive element, the number of turns has to be increased to generate a high voltage. However, it is impossible to increase the number of turns when a conventional winding type coil is used inasmuch as the increase in the number of turns directly results in the increase in weight deteriorating the frequency characteristic of the pickup. When a spiral pattern type coil is used, the number of turns may be readily increased without raising such a problem in connection with weight since, a spiral pattern type coil is so light that it widely differs from that of a conventional winding type coil.

However, the increase in the number of turns of a spiral pattern type coil requires the increase in size, such as the diameter, of the coil unless the density of the spiral pattern is increased. The density, i.e. the number of turns per a given unit area, cannot be increased due to the manufacturing limit defined by the nowaday technique of photolithographic process. Therefore one possible way for increasing the number of turns, which has been taken into account hitherto, is to increase the diameter of the spiral pattern. However, in case of using a large diameter spiral pattern coil, the plane of the spiral pattern is apt to undulate in receipt of vibrations, resulting in the deterioration of the frequency characteristics of the output signal. Therefore, this method of increasing the diameter of the spiral pattern for having a large number of turns is not also practical.

SUMMARY OF THE INVENTION

The present invention has been developed in order to remove the above described difficulty in increasing the number of turns of a coil used in a dynamic phonograph pickup.

It is, therefore, a primary object of the present invention to provide a coil for dynamic phonograph pickups, in which the number of turns is made so, great that the coil generates a high output voltage which is sufficient to be directly applied to the input of a preamplifier.

Another object of the present invention is to provide a coil for dynamic phonograph pickups in which the weight of the coil is considerably smaller than that of conventional winding type coils.

A further object of the present invention is to provide a coil for dynamic phonograph pickups in which the frequency characteristic of the output signal is flat over a wide range.

When it is intended to increase the number of turns in the aforementioned spiral pattern type coil which is made of a microstripline without increasing the density of the spiral pattern and the diameter thereof, it seems to be possible to place a pair of spiral patterns on the both sides of a wafer or a film, which serves as the base of the coil, to connect the spiral patterns in series. However, this arrangement has two disadvantages as follows: The first one is that the thickness of the wafer has to be increased to an extent to have sufficient strength that the wafer will not be broken during manufacturing processes in which the wafer has to be turned upside down to form spiral patterns on the both sides thereof. The increase in the thickness of the wafer may result in the increase in weight of the coil assembly and therefore, this technique is not practical. The second disadvantage is that additional conductive stripline layers have to be provided in order to establish electrical connection between the terminals at the center side of the spiral patterns. Provision of additional layers causes the thickness of the coil assembly to be increased resulting in the increase in weight.

According to the first feature of the present invention, more than two spiral pattern layers are piled up via insulating layers on the same side of a wafer, where the spiral patterns are connected in series.

According to the second feature of the present invention, the connection between terminal of two consecutive spiral patterns is established by a conductor placed in a through-hole made in the insulating layer between the two consecutive spiral patterns.

According to the third feature of the present invention, the through-hole is made by chemical etching and the through-hole is tapered such that the opening area of the through-hole at the upper side is larger than that the lower side so that the electrical connection between the spiral patterns is easily attained.

In accordance with the present invention there is provided a coil assembly comprising: (a) a nonconductive base; (b) a plurality of spiral pattern layers made of conductive microstriplines; said spiral pattern layers being piled up on said base and adjacent spiral pattern layers being separated by an insulating layer; and (c) means for establishing electrical connection between said spiral pattern layers.

In accordance with the present invention there is further provided a method of fabricating a coil assembly comprising the steps of: (a) placing a nonconductive wafer on a substrate; (b) placing a first conductive layer on the wafer; (c) etching the first conductive layer to a desired spiral pattern for forming a first conductive spiral pattern; (d) placing an insulating layer on the first conductive spiral pattern; (e) making through-holes in the insulating layer to a desired through-hole pattern by an etching technique; (f) placing a second conductive layer on the insulating layer, at least one portion of the second conductive layer being put into one of the through-holes to establish an electrical connection between the first and second conductive layers; (g) etching the second conductive layer to a desired spiral pattern for forming a second conductive spiral pattern; (h) repeating the steps of (d) to (g) a predetermined number of times corresponding to the number of spiral pattern layers to be piled up; (i) fixing connecting leads to the terminals of the coil which is constructed of the series connection of the spiral patterns; and (k) placing a nonconductive layer on the top most spiral pattern.

In accordance with the present invention there is further provided a dynamic phonograph pickup comprising: (a) a permanent magnet; (b) a yoke connected to the magnet for having a gap; (c) a stylus arm supported by a supporting member at one end thereof; (d) a stylus fixedly secured to the stylus arm at the other end of the stylus arm; (e) a coil assembly fixedly secured to the stylus arm in the vicinity of the stylus, the coil assembly having at least one coil made of multi-layers of conductive spiral patterns which are piled up on a wafer via insulating means, at least two of the spiral patterns being connected in series so as to develop a voltage across the terminals of the coil when the coil assembly is moved in the gap.

BRIEF DESCRIPTION OF THE DRAWINGS

These and other objects and features of the present invention will become more readily apparent from the following detailed description of the preferred embodiments taken in conjunction with the accompanying drawings in which.

DETAILED DESCRIPTION OF THE PREFERRED EMBODIMENTS

Referring to FIG. 1A to FIG. 1M the manufacturing processes of a coil assembly according to the present invention is shown by way of cross sectional views of a coil chip. Each of the cross sectional views illustrates a portion of a coil chip for simplicity and actually a single chip includes a larger number of turns of a microstripline than illustrated.

Figure 1A:
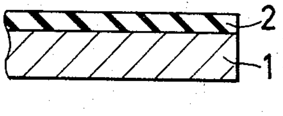
FIGS. 1A to 1M show the manufacturing processes of a two-spiral pattern layer type coil assembly by way of cross sectional views of a coil chip.

In FIG. 1A a reference numeral 1 designates a substrate which is made of a suitable material such as silicone, copper or glass. A reference numeral 2 designates a wafer (base film) which is made of a nonconductive heat resistive resin. The wafer 2 is, for instance a film made of polyimide resin, and is stuck on the surface of the substrate 1 by a suitable technique, such as centrifugal atomizing, with the aid of heat resistive adhesive. This film 2 will serve as the base of the coil after the coil is completed, and the thickness of the film 2 may be between several microns and several tens of microns.

Figure 1B:
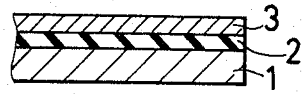
Figure 1C:
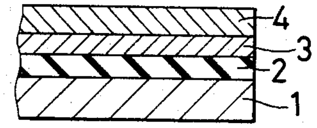

FIG. 1B shows that a conductive film 3 which is made of a metallic material, such as Al, Al-Cu, Al-Si or Al-Cu-Si, is placed on the surface of the polyimide film 2. The conductive film 3 may be placed on the wafer 2 by means of a suitable coating technique, such as vapour coating or sputtering. After the wafer 2 is coated with the conductive film 3, a film of photoresist 4 is placed on the surface of the conductive film 3 as illustrated in FIG. 1C.

Figure 1D:
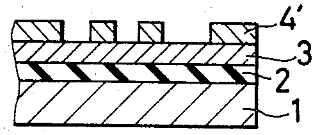

A mask (not shown) of a desired pattern of a spiral microstripline, is then placed over the surface of the photoresist 4 and then the photoresist 4 will be exposed to ultraviolet light, which will be applied by means of a suitable light source, through the mask. By exposing the photoresist 4 to ultraviolet light through the mask, the photoresist become polymerized under the transparent regions of the mask. The mask is now removed, and the photoresist 4 is developed by using a chemical which dissolves the unexposed (unpolymerized) portions of the photoresist film and leaves the surface pattern as shown in FIG. 1D in case of a negative type photoresist. The photoresist 4' which was not removed in development is now fixed, so that it becomes resistant to the corrosive etches used next. A positive type photoresist may be used, if desired, to obtain the same result.

Figure 1E:
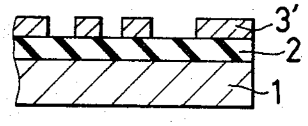
Figure 1F:
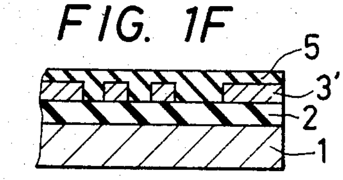
Figure 1G:
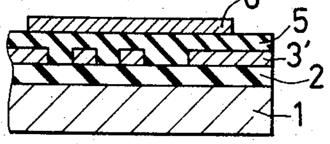

A given kind of gas is applied to the exposed portions of the conductive film 3 to perform dry etching. After the exposed portions are totally etched and are removed, the fixed photoresist 4' is removed as illustrated in FIG. 1E. Now we have obtained a conductive spiral pattern layer 3' formed on the wafer 2. This spiral pattern 3' will be referred to as a first spiral pattern layer hereinafter throughout the specification.

A nonconductive heat resistive film 5, such as a polyimide (an organic insulating matter) film, will be placed on the first spiral pattern layer 3' to perform heat treatment. The nonconductive film 5 will serve as an insulating layer between the first spiral pattern layer 3' and a second pattern layer which will be placed on the nonconductive film 5 in the following process. Utilization of a heat resistive resin as the insulating layer 5 is advantageous in that the surface of the insulating layer 5 is made flat, because of the flowability of the resin, irrespectively of the undulations (projections and recesses) of the etched first spiral pattern layer 3'. The heat treatment of the polyimide resin of the insulating layer 5 is done for removing the solvent thereof and for hardening the resin 5. The final temperature in the heat treatment process is about 350 degrees centigrade.

With the insulating layer 5 coated on the conductive film, i.e. the first spiral pattern layer 3', another photoresist layer 6 is placed on the insulating layer 5. A second mask (not shown) which corresponds to a desired pattern of through-holes (openings) is put over the photoresist layer 6. The photoresist layer 6 will be processed in the same manner as the first photoresist layer 4 has been etched photolithographically as shown in FIG. 1C to FIG. 1E. As the result of this process, the photoresist layer 6 is etched partially to the pattern of the through-holes as illustrated in the right-upper part of FIG. 1G, while the insulating layer 5 is coated with the photoresist layer 6 except portions at which through-holes are intended to be made in the insulating layer 5.

Figure 1H:
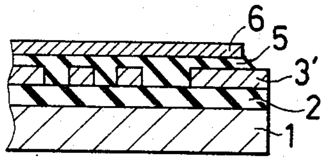

The exposed portions of the insulating layer 5 will be chemically etched. In case that the insulating layer 5 is made of polyimide, chemical fluid including hydrazine hydrate as its chief component is most suitable for etching the insulating layer 5 to make through-holes. FIG. 1H illustrates that a through-hole is made in the insulating layer 5 by the above described process. It is to be noted that the through-hole was made to have reversed truncated cone shape rather than a cylindrical shape. Namely, the cross sectional view of the through-hole is of trapezium, while the length of the base of the trapezium is smaller than that of the opposite leg.

Figure 2:
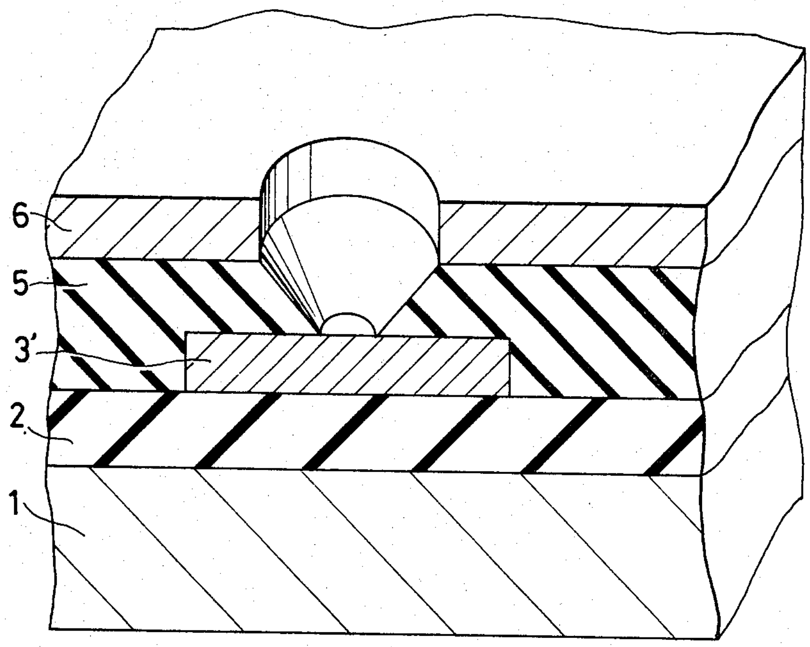
FIG. 2 is an enlarged view of the through-hole shown in FIG. 1H.

The through-hole is shown in FIG. 2 by an enlarged view which corresponds to the cross sectional view of FIG. 1H. As will be described hereinlater the through-hole will be used to electrically connect a terminal of the first spiral pattern layer 3' with a terminal of the second spiral pattern layer 7 which will be formed on the insulating layer 5. It will be readily understood that such a through-hole of tapered shape is advantageous for ensuring the connection between terminals of the first and second spiral pattern layers. Although the shape of the through-hole shown in FIG. 2 is of reversed truncated cone, other shapes may be selected and if the through-hole is tapered in such a manner that the opening area of the through-hole at the upper side, i.e. the second spiral pattern layer side, is larger than that of the same at the lower side, i.e. the first layer spiral pattern layer side, the electrical connection between the first and second spiral patterns will be established easily since a portion of the conductive material of the second spiral pattern layer 7 is readily inserted therein to reach the surface of the exposed first spiral pattern layer 3'. Furthermore, because of the tapered through-hole the conductive material filled in the through-hole is hardly likely to be broken.

The slope of the side wall defining the tapered through-hole will be controlled at will by any one of the following methods:

(1) The slope becomes steeper as the percentage of the hydrazine hydrate in the etching solution decreases;

(2) The slope becomes steeper as the temperature in the heat treatment rises; and (3) The upper opening area of the through-hole will grow larger upon application of a particular kind of a gas when used in surface treatment in connection with the exposed areas of the first spiral pattern layer 3'.

Of course more than two of the above three methods may be used to determine the slope of the tapered through-hole and actually all of the three methods are concurrently used.

Figure 1I:
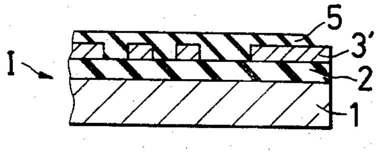
Figure 1J:
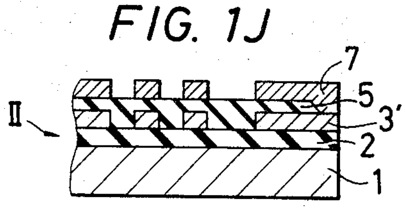

After through-hole are made, the photoresist layer 6 is removed and we obtain a first stage intermediate product I as illustrated in FIG. 1I. On the insulating polyimide layer 5, a second spiral pattern 7 will be made in the same manner as the first spiral pattern 3'. In other words, the second spiral pattern layer 7 will be placed in the similar manner as the processes shown in FIG. 1B to FIG. 1E. After the second spiral pattern layer 7 is formed on the insulating layer 5, we obtain a second stage intermediate product II as illustrated in FIG. 1J.

Figure 1K:
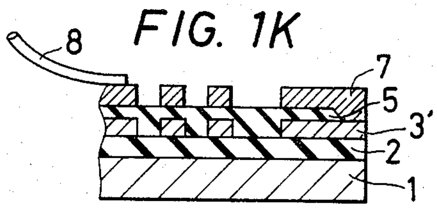
Figure 1L:
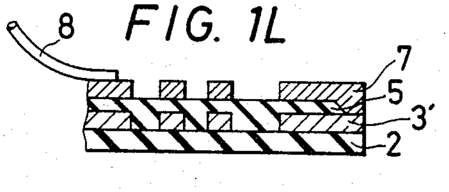
Figure 1M:
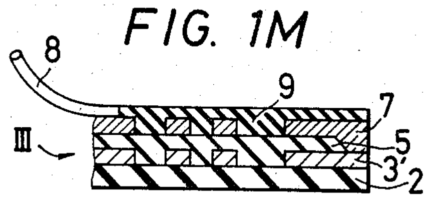

Although the above description of the fabricating processes is made in connection with a single chip of a coil, actually hundreds of chips are simultaneously formed on the same substrate 1 in a similar manner as integrated circuits chips are made. After forming the first and second spiral pattern layers 3' and 7, the entire substrate, on which the first and second spiral pattern layers 3' and 7 are formed, will be divided by means of suitable tools, such as a scriberdicer, into individual pieces of chips. With the chips separated from each other, a connecting lead 8 is fixed to a terminal of the second spiral pattern 7, by ultrasonic bonding, as shown in FIG. 1K. Meanwhile, another connecting lead (not shown) is fixed to a terminal of the first spiral pattern layer 3' in the same manner. Although the connection of this connecting lead is not shown, it will be understood that the connecting lead reaches the terminal of the first spiral pattern layer 3' via a through-hole (not shown) made in the insulating layer 5, which through-hole was made in the process of FIG. 1I. The substrate 1 is then removed by a suitable method such as etching and we will have a coil chip, as shown in FIG. 1L. The surface of the chip shown in FIG. 1L is coated with a suitable nonconductive surface treatment material, such as varnish or photoresist so as to provide a finished product III as illustrated in FIG. 1M.

Figure 3:
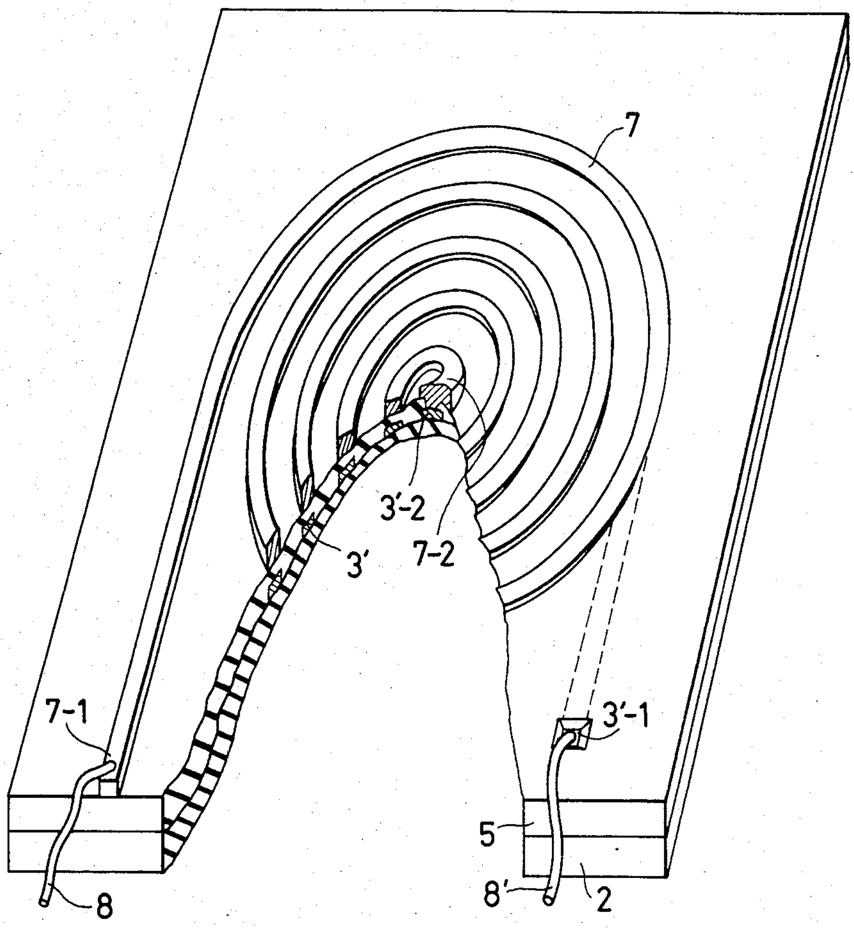
FIG. 3 is a perspective view of a coil assembly corresponding to FIG. 1L.

FIG. 3 illustrates a perspective view of a single coil chip corresponding to FIG. 1L. The coil shown in FIG. 3 comprises first and second spiral pattern layers 3' and 7 which are piled up via the insulating layer 5. The first spiral pattern layer 3', which is seen as a plurality of strips in the cross sectional view, is of counterclockwise turns when viewed from the top and has first and second terminals 3'-1 and 3'-2 at both ends thereof. The second spiral pattern layer 7 which is placed over the first spiral pattern layer 3', is of clockwise turns when viewed from the top and also has first and second terminals 7-1 and 7-2 at both ends. The first terminals 3'-1 and 7-1 of the first and second spiral pattern layers 3' and 7 are respectively located at the periphery of the spiral patterns, while the second terminals 3'-2 and 7-2 are respectively located at the centers of the spiral patterns. The first terminal 3'-1 of the first spiral pattern layer 3' is connected to a connecting lead 8', while the first terminal 7-1 of the second spiral pattern layer 7 is connected to a connecting lead 8. The second terminals 3'-2 and 7-2 of the first and second spiral patterns 3' and 7 are directly connected to each other via a portion of the second spiral pattern 7 placed in the through-hole made in the insulating layer 5. The outer most portion of the first spiral pattern layer 3' is depicted by dotted lines and is shown to be connected to the connecting lead 8' which reaches the first terminal 3'-1 via the through-hole provided at the edge portion of the insulating layer 5. Although the first and second spiral patterns 3' and 7 are of oval shape, other shapes of spiral patterns may be adapted.

Figure 4A:
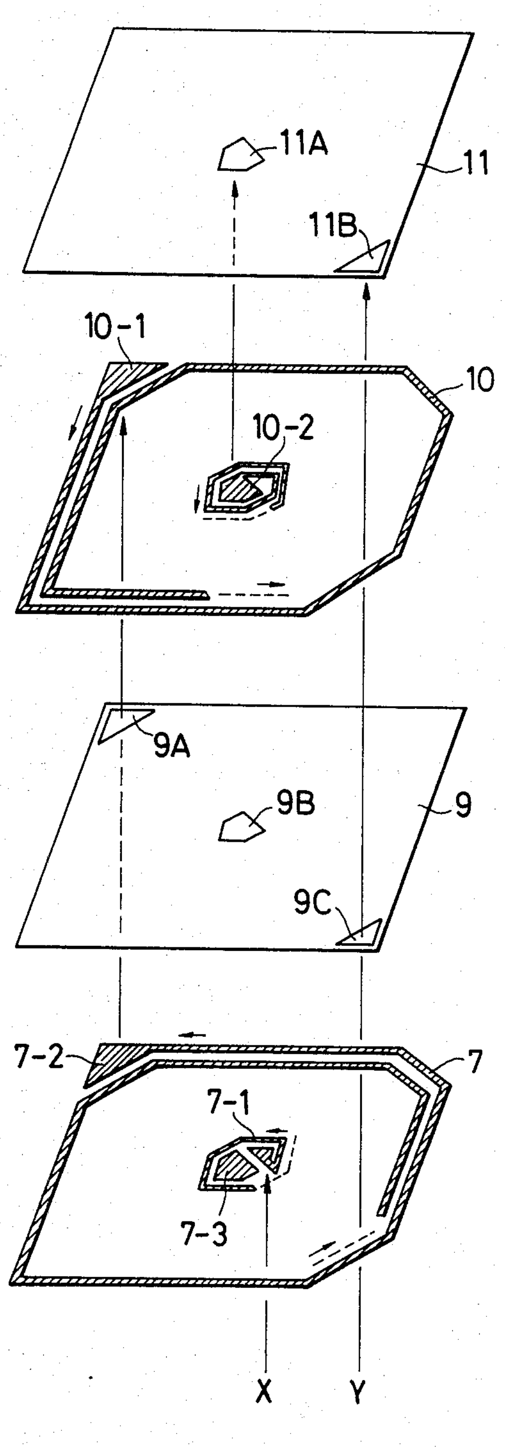
FIGS. 4A and 4B constitute a single drawing which shows an exploded view of three-spiral pattern layer type coil assembly according to the present invention.
Figure 4B:
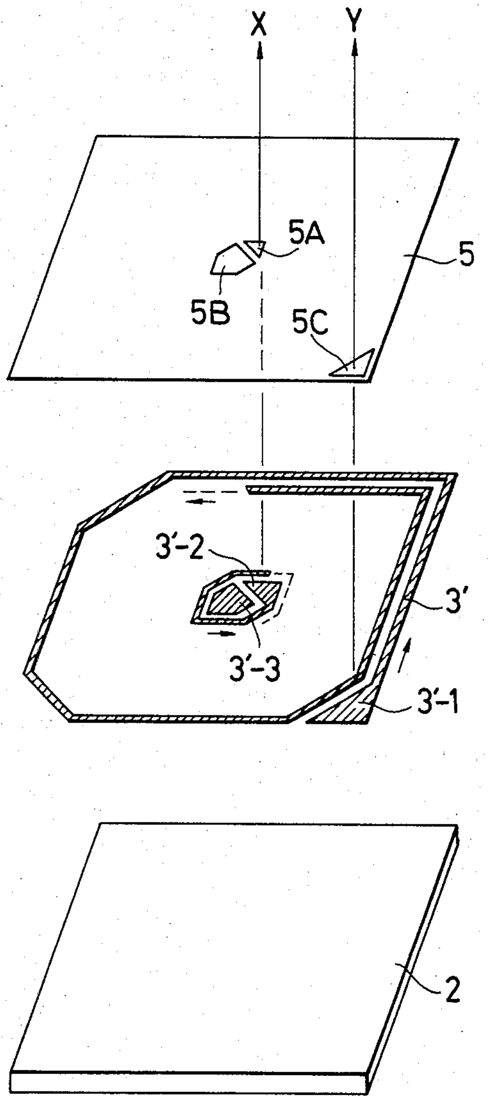

Reference is now made to FIGS. 4A and 4B, which constitute a single drawing, showing a second embodiment of the coil assembly according to the present invention. The second embodiment coil assembly comprises three spiral pattern layers 3', 7 and 10 which are pilled up in the similar manner as the first embodiment coil assembly shown in FIG. 1M and FIG. 3. for a better understanding the third embodiment coil assembly is shown by way of an exploded view in FIGS. 4A and 4B, while the same parts or elements which are also used in the first embodiment are designated by the same reference numerals.

Each of the first to third spiral layers 3', 7 and 10 has first and second terminals 3'-1, 7-1, 10-1, 3'-2, 7-2 and 10-2. Three insulating layers 5, 9 and 11 are provided in such a manner that the first insulating layer 5 is placed between the first and second spiral patterns 3' and 7, the second insulating layer 9 is placed between the second and third spiral pattern layers 7 and 10, and the third insulating layer 11 is placed on the third spiral pattern layer 10. Several through-holes are made in each insulating layer so that electrical contacts between the spiral patterns 3', 7 and 10 will be established and connecting leads will be connected to terminals of the coil. All of the above described layers are piled up on the wafer 2. The spiral patterns 3', 7 and 10 have a shape of heptagon but other shape, such as any polygon, may be adopted if desired.

The first spiral pattern 3' directly placed on the wafer 2 has first and second terminals 3'-1 and 3'-2 respectively located at the outer and inner sides. The first terminal 3'-1 is connected to a connecting lead (not shown) which extends through the triangular through-holes 5C, 9C and 11B made in the first, second and third insulating layers 5, 9 and 11. The second terminal 3'-2 of the first spiral pattern layer 3' is connected to the first terminal 7-1 of the second spiral pattern layer 7 via the triangular through-hole 5A made in the first insulating layer 5. The second terminal 7-2 of the second spiral pattern layer 7 is connected via the triangular through-hole 9A to the first terminal 10-1 of the third spiral pattern layer 10, the second terminal 10-2 of which is connected to a connecting lead (not shown) which extends through the pentagonal through-hole 11A made in the third insulating layer 11. The above described connections are implied by three vertical lines with arrows, where the relationship between the lines in FIG. 4A and FIG. 4B is indicated by references X and Y. The pentagonal through-holes 5B and 9B of the first and second insulating layers 5 and 9 are used to connect the second terminal 10-2 of the third spiral pattern layer 10 with pentagonal portions 7-2 and 3'-3 of the second and first spiral pattern layers 7 and 3'. These pentagonal portions 7-3 and 3'-3 are not parts of the spiral patterns but are connected with the second terminal 10-2 of the third spiral pattern layer 10 so as to reinforce the terminal 10-2 preventing the terminal 10-2 from coming off. Arrows are depicted along the striplines of the first to third spiral pattern layers 3', 7 and 10 to indicate the direction of turns of the coil. The direction of these arrows may indicate the direction of an electric current flow at an instance, where the direction is toward the center of the spiral patterns in the first and third spiral pattern layers 3' and 10, and is toward the periphery of the spiral pattern in the second spiral pattern layer 7.

Two embodiments of the coil assembly according to the present invention have been discussed in connection with double spiral pattern layer type and a triple spiral pattern layer type. However, the number of spiral pattern layers may be increased, if desired, by repeating the processes shown in FIG. 1B to FIG. 1F.

Figure 5:
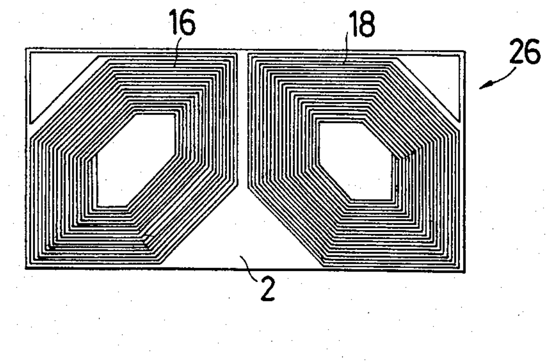
FIG. 5 shows a pair of coils formed on the same wafer, which coils are used for a stereophonic sound reproducing system.

When a dynamic pickup is adapted to a stereophonic sound reproducing system, a pair of moving coils is required as is well known. FIG. 5 shows a pair of coils 16 and 18 formed on the same wafer 2. These two coils 16 and 18 are subjected to generate respective electrical signals corresponding to the left and right channel sounds when moved by means of a stylus arm in a magnetic field. The spiral patterns respectively forming two coils are of hexagonal shape and are arranged on a chip with a predetermined angle so as to most effectively pick up the left and right channel audio signals. In this way a single chip including a pair of coils can be fabricated. By using such a chip of three spiral pattern layers, the dimensions of which is 1×2×0.04 mm, the thickness of each spiral pattern layer made of aluminum strips being approximately 1 micron, the weight of the chip being approximately 240 micrograms, the number of turns of each coil being 150, i.e. 50 turns for each spiral pattern layer, we have obtained experimental results such that the output voltage is approximately 1.6 mV and the frequency characteristic is from 10 to 50,000 Hz.

Figure 6:
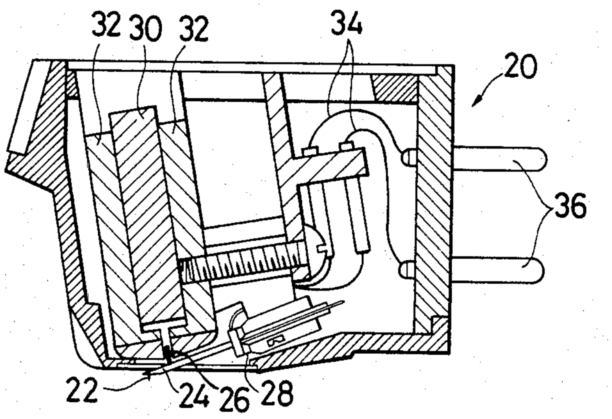
FIG. 6 shows a dynamic phonograph pick up in which a coil assembly according to the present invention is used.

Reference is now made to FIG. 6 which shows a stereophonic cartridge in which the moving-coil according to the present invention is disposed. The cartridge 20 comprises a casing generally denoted by a reference numeral 20, a permanent magnet 30, a yoke 32, a coil assembly 26, a stylus arm 24, a stylus 22, a stylus supporting member including a damper 28, terminals 36, and connecting leads 34. The magnet 30 and the yoke 32 are fixedly supported by means of a bolt, while the stylus arm 24 is supported at one end thereof by the supporting member via the damper 28. The stylus 22 is disposed at the other end of the stylus arm 24 so as to be put in the groove of a phonograph record (not shown). The coil assembly 26, which may substantially correspond to the coil chip illustrated in FIG. 5, is fixedly secured to the stylus arm 24 in the vicinity of the stylus 22. Both ends of the yoke 32 constitute a gap to develop a magnetic field therein. The coil assembly 26 is interposed in the gap formed by the yoke 32 in such a manner that the coil assembly 26 is freely movable in the gap in accordance with the movement of the stylus arm 24. The terminals of the coil assembly 26 are respectively connected by means of the connecting leads 34 to the terminals 36 of the cartridge. It will be understood that since the coil assembly 26 is extremely light in weight, it can be placed in the vicinity of the stylus 22 on the stylys arm 24. Consequently, the vibrations picked up by the stylus 22 is almost directly transmitted to the coil assembly 26 via a short distance so that distortion which may occur in the vibratory system in a phonograph pickup can be considerably reduced compared to conventional pickups.

Although in the above described embodiments a plurality of spiral patterns are connected in series so as to develop a high voltage across the coil terminals, the spiral patterns of multi-layer coil may be connected in parallel resulting in the reduction of the impedance of the coil. For instance, when the number of spiral patterns connected in parallel is "n", the total impedance of the coil equals one "n"th the impedance of each spiral pattern. The reduction of impedance of a coil is advantageous for impedance matching with the following circuit, such as a preamplifier or a step up transformer.

Furthermore, when a coil assembly comprises more than three spiral patterns, a series-parallel connection between spiral patterns may be possible so that the voltage developed by the coil is high enough, while the impedance of the coil is low enough.

The present invention has been described in connection with a moving coil type phonograph pickup by way of various embodiments. However, the application of the present invention is not limited to such a phonograph pickup. The coil assembly according to the present invention may be used in other devices and apparatus, such as a vibration pickup for a vibration meter. It will be further recognized that the coil according to the present invention may be used as a part of an electromechanical transducer. Furthermore, the coil according to the present invention may be utilized as a simple inductace element in an electrical circuit.

What is claimed is:

1. A coil assembly for use with a moving coil stereo phonograph pickup, comprising a pair of coils embedded in a unit body, each of said coils comprising:

(a) a nonconductive base;

(b) stacked spiral pattern layers made of conductive microstriplines, said spiral pattern layers being formed on said nonconductive base, the number of said spiral pattern layers being at least three;

(c) an insulating material forming a multiple overlay of polyimide films, one of said polyimide films being placed on one of said stacked spiral pattern layers and filling gaps between adjacent turns of said one of the stacked spiral pattern layers, which is located opposite to said base, each of the remaining polyimide films being interposed between any two consecutive spiral pattern layers and filling gaps between adjacent turns of one of said two consecutive spiral pattern layers, each of said polyimide films being formed through a heat process with which solvent of liquid polyimide is removed to harden the same so as to provide a flat surface of an insulating layer; and (d) means for establishing electrical connection between said spiral pattern layers, said means comprising a conductive member connected between any two consecutive spiral pattern layers;

said pair of coils being arranged so that they are symmetrical with a center line which bisects said coil assembly.

2. A coil assembly as claimed in claim 1, wherein said spiral pattern layers are electrically connected in series so as to generate a necessary voltage when operating in a magnetic field.

3. A coil assembly as claimed in claim 1, wherein said conductive member is filled in a through-hole made in said insulating layer between any two consecutive spiral pattern layers.

4. A coil assembly as claimed in claim 1, wherein said insulating layer has a thickness of between several microns and several tens of microns.

5. A method of fabricating a coil assembly comprising the steps of:

(a) placing a nonconductive wafer on a substrate;

(b) placing a first conductive layer on said wafer;

(c) etching said first conductive layer to a desired spiral pattern for forming a first conductive spiral pattern;

(d) placing liquid polyimide on said first conductive spiral pattern to fill gaps between adjacent turns of said first conductive spiral pattern and to coat said first conductive spiral pattern, and heating the placed liquid polyimide to remove a solvent therefrom and to harden the polyimide, thereby making an insulating layer of polyimide;

(e) making through-holes in said insulating layer by etching to a desired through-hole pattern;

(f) placing a second conductive layer on said insulating layer, at least one portion of said second conductive layer being inserted into one of said through-holes to establish an electrical connection between said first and second conductive layers;

(g) etching said second conductive layer to a desired spiral pattern for forming a second conductive spiral pattern;

(h) repeating said steps of (d) to (g) a predetermined number of times corresponding to the number of spiral pattern layers to be piled up;

(i) fixing connecting leads to the terminals of the coil which is constructed of the series connection of the spiral patterns;

(k) placing a nonconductive layer on the top most spiral pattern; and (l) removing said substrate.

6. A method of fabricating a coil assembly as claimed in claim 5 wherein a number of coil chips are made on the same wafer to be divided into individual pieces after a plurality of spiral patterns are formed on said wafer.

7. A dynamic phonograph pickup comprising:

(a) a permanent magnet;

(b) a yoke connected to said magnet for having a gap;

(c) a stylus arm supported by a supporting member at one end thereof;

(d) a stylus fixedly secured to said stylus arm at the other end of said stylus arm; and (e) a coil assembly fixedly secured to said stylus arm in the vicinity of said stylus, said coil assembly having at least one coil made of multi-layers of conductive spiral patterns which are stacked on a wafer via insulating means, at least two of said spiral patterns being in a series so as to develop a voltage across the terminals of the coil when the coil assembly is moved in said gap, said coil assembly having;

(i) a nonconductive base;

(ii) stacked spiral pattern layers made of conductive microstriplines, said spiral pattern layers being formed on said nonconductive base, the number of said spiral pattern layers being at least three;

(iii) an insulating material forming a multiple overlay of polyimide films, one of said polyimide films being placed on one of said stacked spiral pattern layers and filling gaps between adjacent turns of said one of the stacked spiral pattern layers, which is located opposite to said base, each of the remaining polyimide films being interposed between any two consecutive spiral pattern layers and filling gaps between adjacent turns of one of said two consecutive spiral pattern layers, each of said polyimide films being formed through a heat process with which solvent of liquid polyimide is removed to harden the same so as to provide a flat surface of an insulating layer; and (iv) means for establishing electrical connection between said spiral pattern layers, said means comprising a conductive member connected between any two consecutive spiral pattern layers.

8. A dynamic phonograph pickup as claimed in claim 7, wherein said coil assembly comprises a pair of coils which are adapted to respectively pick up right and left channel audio signals of stereophonic sound.

* * * * *